UNITED STATES PATENT OFFICE.

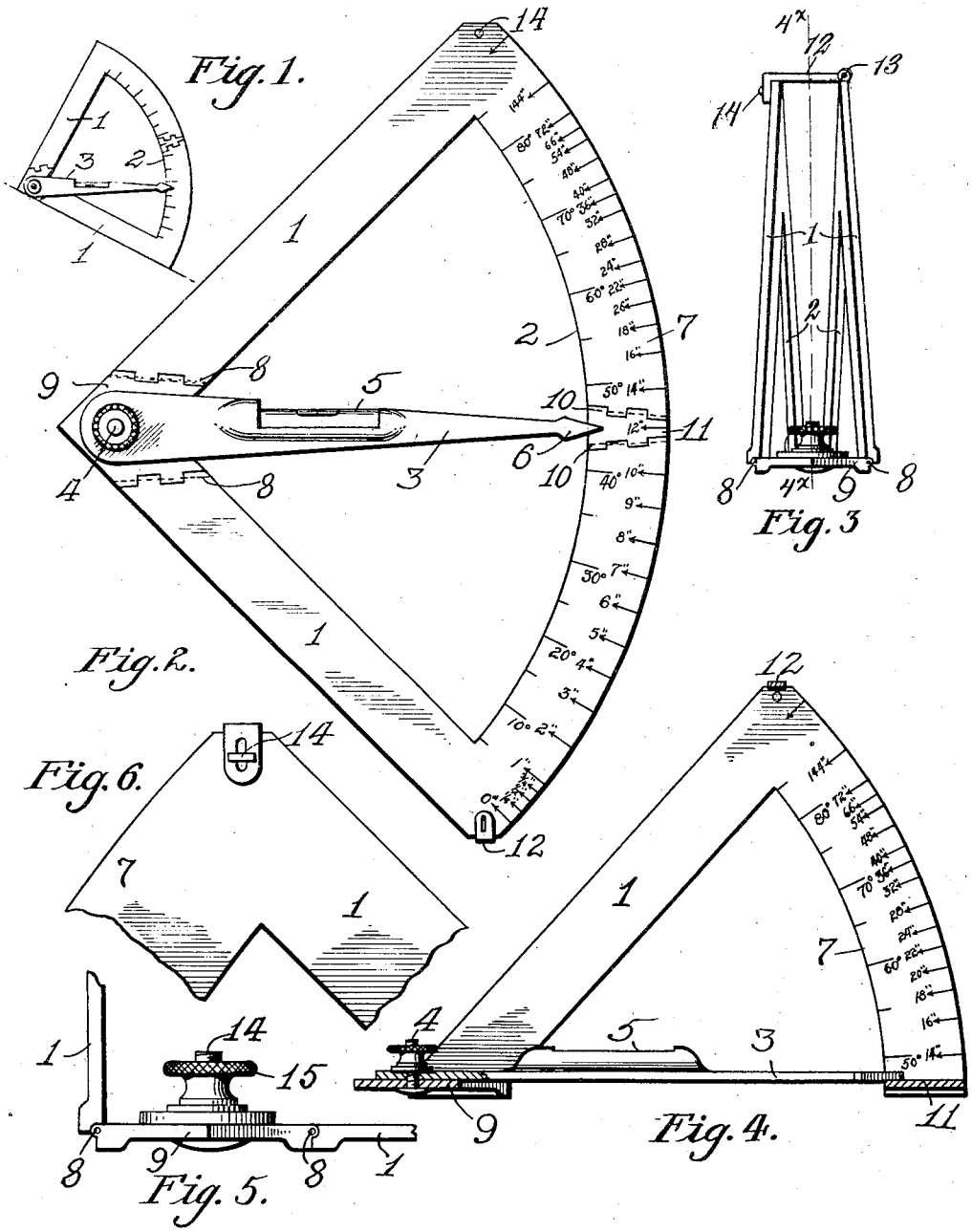

CHARLES H. G. FORD, OF ROCHESTER, NEW YORK.

DEGREE AND ROOF-PITCH FINDER.

1,203,521.  Specification of Letters Patent.  Patented Oct. 31, 1916.

Application filed November 11, 1915. Serial No. 60,917.

*To all whom it may concern:*

Be it known that I, CHARLES H. G. FORD, a citizen of the United States, residing at Rochester, in the county of Monroe and State of New York, have invented certain new and useful Improvements in Degree and Roof-Pitch Finders, of which the following is a specification.

This invention relates to a device for determining the angle of inclination of a roof or other inclined surface or line, and has for its object to provide a device involving known principles of arrangement and use, but embodying novel details of construction which adapt it to fold into form which will be convenient for carrying, and insure protection of a level device with which it is provided.

The invention will be fully understood upon reference to the accompanying drawing, in which—

Figure 1 is a view of the device on a reduced scale, in position illustrating its use; Fig. 2 is a view of the same on a larger scale, and in condition for use; Fig. 3 is an edge view of the device folded for carrying; Fig. 4 is a section on the line $4^x$—$4^x$ of Fig. 3; Fig. 5 is a detail view on an enlarged scale of the pintle for the level indicator, together with the two hinges adjacent thereto; and Fig. 6 is a detail view of the clasp for holding the parts in folded position.

1 represents the straight or radial sides and 2 the arc of a quadrant, and 3 represents the level indicator mounted upon a pintle 4 at the center upon which the arc is constructed, bearing a level 5 through which to determine the true horizontal position of the indicator, and having its forward end 6 swinging in relation to a scale 7, so as to indicate upon the latter, the inclination of the lower face of one of the radial arms 1 to the horizon, when the level indicator 3 is horizontal. Thus far no claimed novelty has been described. Devices of this kind, as well as the uses to which they are put, are well understood. For instance, to indicate the pitch of a roof which it is desired to ascertain for calculating purposes, the lower face of the radial arm 1 is laid upon the roof and the indicator arm 3 is then swung until its level indicates a horizontal position. The reading of its point 6 upon the scale 7 will be the inclination of the surface being measured in inches pitch to foot.

To facilitate carrying an instrument of this kind and to protect its level indicator while being carried, the arms 1 are hinged at 8 to the pintle member 9, while the arc 2 is divided near its intermediate radius and connected through hinges 10 with its middle piece 11. These hinges adapt the instrument to fold into the form shown in Fig. 3, in which it cannot only be more conveniently carried, but protected against injury. To hold the parts in the folded position, a link 12, hinged to one arm at 13 and releasably connected to the other arm by the turn-button 14, is provided at the intersections of the arms with the arc, whereby said arms are held in spaced relation. The hinges 8 and 10 are preferably of the construction shown in Fig. 5, which adapts them to arrest the opening movement of the device when the parts reach the same plane. The milled head 15 on the pintle 4 adapts the pintle to clamp the level indicator in any position.

From the foregoing description, it will be observed that the device takes the known sector employed in instruments of this kind and hinges its parts along two lines on opposite sides of an intermediate radius, so that when the level indicator lies in the intermediate position, the portion beneath it constitutes a base upon which the outer portions swing upwardly as two protecting side arms, and being secured in these protecting positions, they at once save the level indicator from injury and reduce the outside dimensions of the device, so that it can be conveniently carried.

I claim:—

1. A device for measuring inclinations, comprising a sector embodying radial arms and an arc, and having a level indicator pivoted concentrically with the arc and coacting therewith to register degrees of inclination; the members of the sector being divided and hinged along two lines on opposite sides of the intermediate position of the level indicator, thereby adapting the parts of the sector to fold.

2. A device for measuring the inclination of surfaces, comprising a sector having a center portion, arms radiating from the center portion and connected thereto, through means of hinges suitably spaced apart, a level indicator pivoted upon the center portion, and an arc connected at its ends to the radiating arms and divided and hinged intermediately and in line with the hinges of the center portion, thereby adapting the sector to fold on opposite sides of the level indicator when the latter is in intermediate position.

3. A device for measuring angles of inclination, comprising a center piece, a level indicator pivoted on said center piece, a pair of arms radiating from said center piece, and hinged thereto on opposite sides of the level indicator, an arc formed of a reduced intermediate portion, and two end portions which are hinged to the intermediate portion and integral with the radiating arms, and a clasp secured to the arms at their intersections with the arc.

The foregoing specification signed at Rochester, New York, this 17th day of March, 1915.

CHARLES H. G. FORD.